(12) United States Patent
Kim et al.

(10) Patent No.: US 11,897,371 B2
(45) Date of Patent: Feb. 13, 2024

(54) SEAT FRAME

(71) Applicant: POSCO, Pohang-si (KR)

(72) Inventors: Jae-Hyun Kim, Incheon (KR); Hong-Woo Lee, Incheon (KR); Dong-Yoon Seok, Incheon (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/632,119

(22) PCT Filed: May 28, 2020

(86) PCT No.: PCT/KR2020/006944
§ 371 (c)(1),
(2) Date: Feb. 1, 2022

(87) PCT Pub. No.: WO2021/029520
PCT Pub. Date: Feb. 18, 2021

(65) Prior Publication Data
US 2022/0274510 A1    Sep. 1, 2022

(30) Foreign Application Priority Data

Aug. 9, 2019 (KR) .......................... 10-2019-0097437

(51) Int. Cl.
*B60N 2/12* (2006.01)
*B60N 2/16* (2006.01)
(Continued)

(52) U.S. Cl.
CPC ............... *B60N 2/165* (2013.01); *B60N 2/07* (2013.01); *B60N 2/12* (2013.01); *B60N 2/1615* (2013.01); *B60N 2/68* (2013.01)

(58) Field of Classification Search
CPC ....... B60N 2/1615; B60N 2/12; B60N 2/3031
See application file for complete search history.

(56) References Cited

U.S. PATENT DOCUMENTS

| | | | |
|---|---|---|---|
| 4,903,931 A | | 2/1990 | Shimazaki |
| 6,000,742 A | * | 12/1999 | Schaefer ................. B60N 2/36 |
| | | | 296/65.09 |

(Continued)

FOREIGN PATENT DOCUMENTS

| | | |
|---|---|---|
| CN | 101992706 A | 3/2011 |
| CN | 102917914 A | 2/2013 |

(Continued)

OTHER PUBLICATIONS

European Search Report dated Aug. 17, 2022 issued in European Patent Application No. 20852303.5.

(Continued)

*Primary Examiner* — Timothy J Brindley
(74) *Attorney, Agent, or Firm* — Morgan, Lewis & Bockius LLP

(57) ABSTRACT

The present invention relates to a seat frame with reduced weight due to not including a cushion side frame, the seat frame comprising: a pair of rails; a cushion frame which supports a cushion and has a closed cross-sectional shape; front links which connect the rails to the cushion frame on the front side; rear links which connect the rails to the cushion frame on the rear side; and connection brackets which connect the rear links to a seatback frame.

7 Claims, 5 Drawing Sheets

(51) Int. Cl.
*B60N 2/07* (2006.01)
*B60N 2/68* (2006.01)

(56) References Cited

U.S. PATENT DOCUMENTS

| | | | | |
|---|---|---|---|---|
| 6,601,900 | B1* | 8/2003 | Seibold | B60N 2/36 |
| | | | | 296/65.09 |
| 8,313,144 | B2* | 11/2012 | Holdampf | B60N 2/3031 |
| | | | | 297/378.12 |
| 8,424,969 | B2* | 4/2013 | Kammerer | B60N 2/3065 |
| | | | | 297/378.12 |
| 8,474,910 | B2* | 7/2013 | Kammerer | B60N 2/3013 |
| | | | | 296/65.09 |
| 8,882,197 | B2* | 11/2014 | Line | B60N 2/3031 |
| | | | | 297/331 |
| 10,899,250 | B2* | 1/2021 | Aktas | B60N 2/14 |
| 10,926,673 | B2* | 2/2021 | Kaemmerer | B60N 2/225 |
| 11,279,260 | B2* | 3/2022 | Kim | B60N 2/3011 |
| 11,332,044 | B2* | 5/2022 | Runde | B60N 2/1615 |
| 2009/0152433 | A1 | 6/2009 | Choi et al. | |
| 2010/0102586 | A1 | 4/2010 | Jungert et al. | |
| 2011/0043027 | A1 | 2/2011 | Hayahara et al. | |
| 2013/0264854 | A1* | 10/2013 | Romer | B60N 2/12 |
| | | | | 297/317 |
| 2015/0108813 | A1 | 4/2015 | Muller et al. | |
| 2019/0366886 | A1* | 12/2019 | Sivaraj | B60N 2/3011 |
| 2020/0101869 | A1* | 4/2020 | Bouzid | B60N 2/309 |
| 2020/0164772 | A1* | 5/2020 | Kong | B60N 2/165 |
| 2021/0016690 | A1* | 1/2021 | Aoki | B60N 2/1615 |
| 2021/0394650 | A1* | 12/2021 | Holder | B60N 2/12 |
| 2022/0305965 | A1* | 9/2022 | Lücke | B60N 2/1842 |

FOREIGN PATENT DOCUMENTS

| | | | | |
|---|---|---|---|---|
| CN | 104245414 A | | 12/2014 | |
| DE | 19740045 A1 | * | 3/1999 | ........... B60N 2/0284 |
| DE | 10306626 A1 | | 9/2004 | |
| DE | 102018119702 B4 | * | 6/2020 | |
| EP | 2562031 A1 | | 2/2013 | |
| EP | 3176027 A1 | | 6/2017 | |
| EP | 3543066 A1 | * | 9/2019 | .............. B60N 2/12 |
| FR | 3086600 A1 | * | 4/2020 | ........... B60N 2/0232 |
| JP | S60-45436 A | | 3/1985 | |
| JP | H07-25274 A | | 1/1995 | |
| JP | H09-156404 A | | 6/1997 | |
| JP | H09-322837 A | | 12/1997 | |
| JP | 2003-220867 A | | 8/2003 | |
| JP | 2011-157026 A | | 8/2011 | |
| JP | 2013-189139 A | | 9/2013 | |
| JP | 2015-81061 A | | 4/2015 | |
| KR | 10-2009-0063583 A | | 6/2009 | |
| KR | 10-2012-0072602 A | | 7/2012 | |
| KR | 10-2013-0032599 A | | 4/2013 | |
| KR | 10-2014-0085969 A | | 7/2014 | |
| KR | 10-1776515 B1 | | 9/2017 | |
| KR | 10-1881272 B1 | | 7/2018 | |
| KR | 10-2021-0017721 A | | 2/2021 | |

OTHER PUBLICATIONS

International Search Report dated Sep. 3, 2020 issued in International Patent Application No. PCT/ KR2020/006944 (with English translation).

Communication dated Jun. 20, 2023 for corresponding Japanese Patent Application No. 2022-507693.

Office Action issued in corresponding Chinese Patent Application No. CN 202080056291.X dated Sep. 7, 2023, with English translation.

* cited by examiner

[FIG. 1]
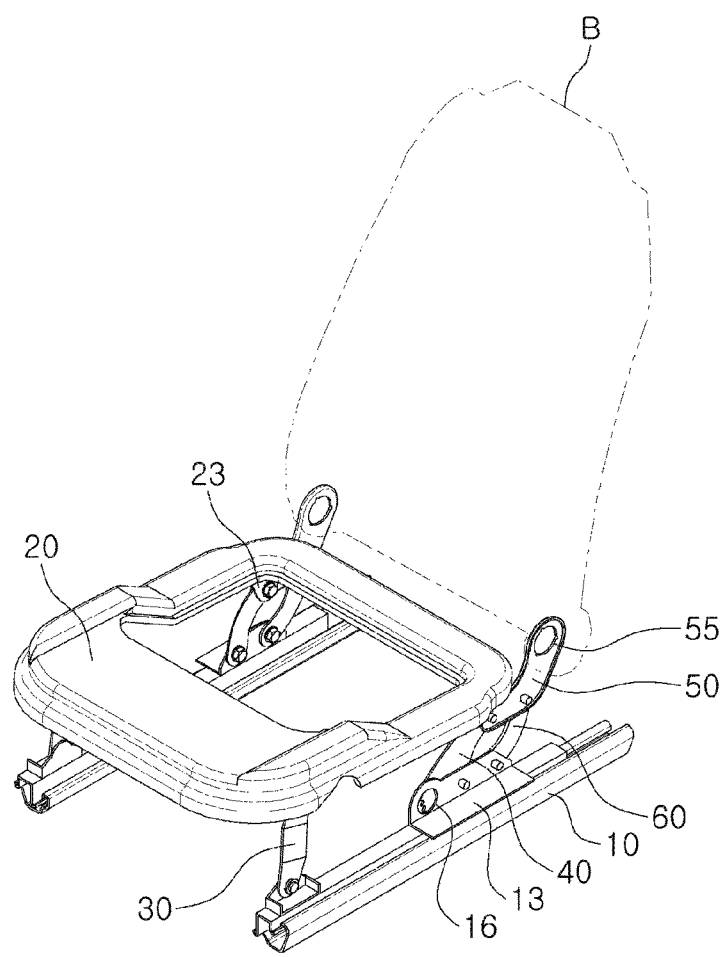

[FIG. 2]
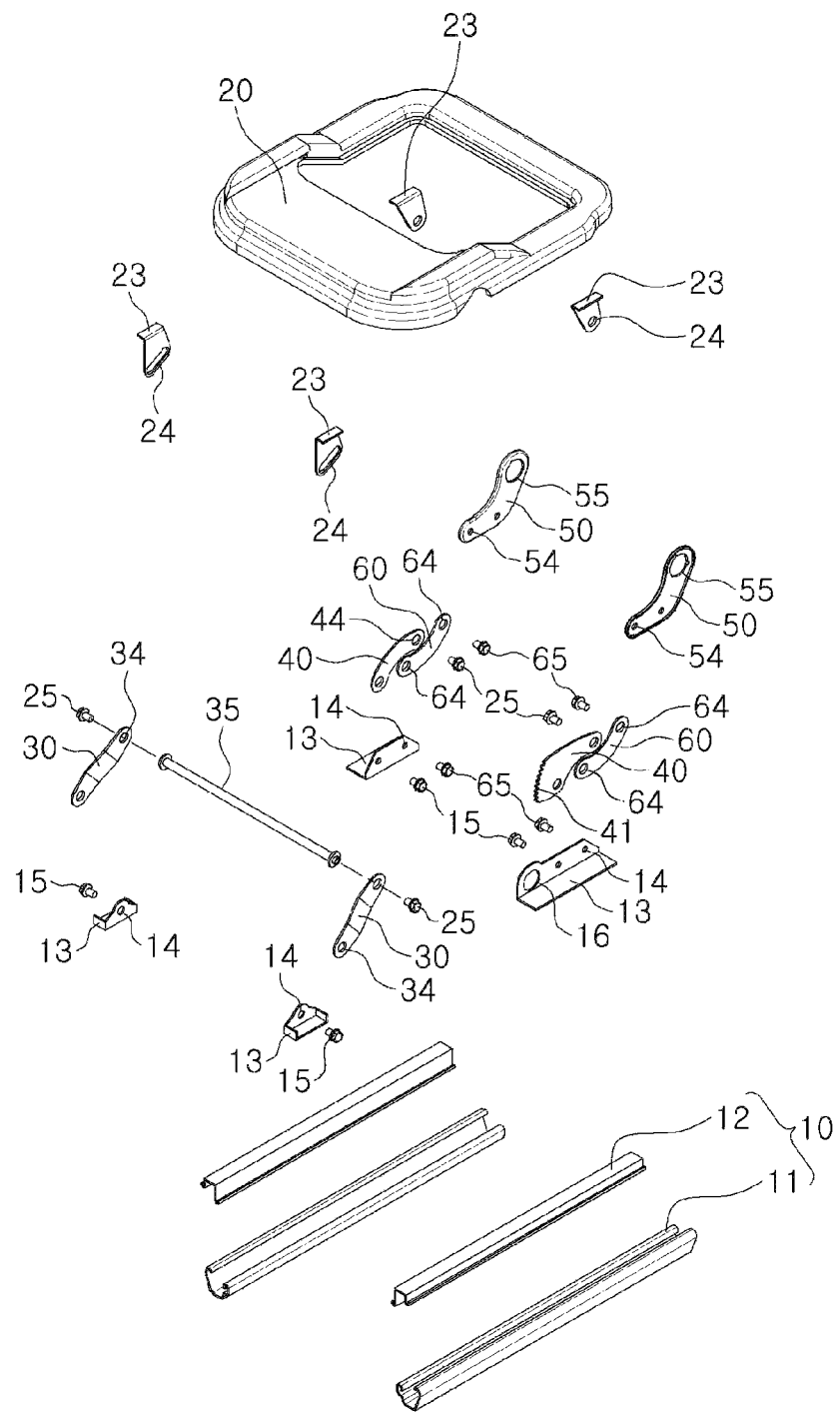

【FIG. 3】
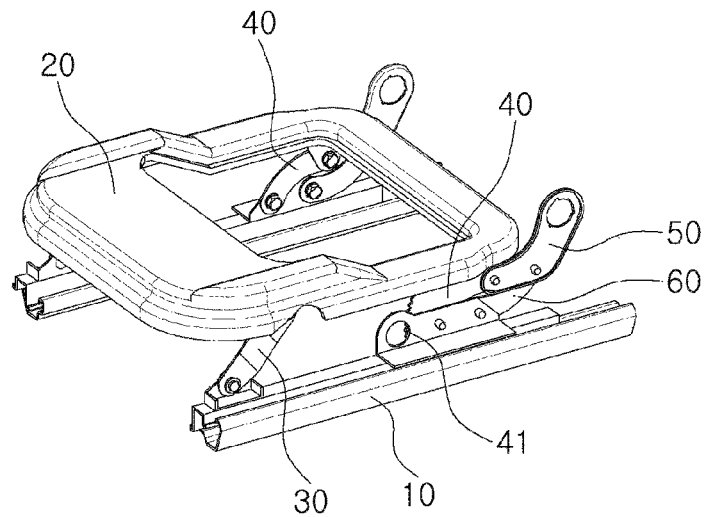
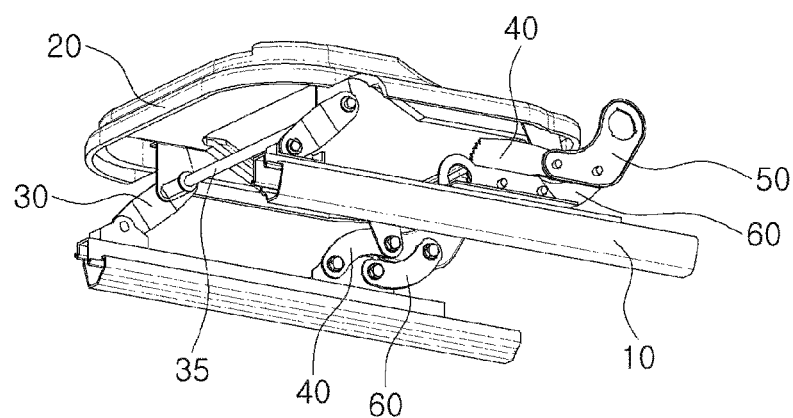

[FIG. 4]
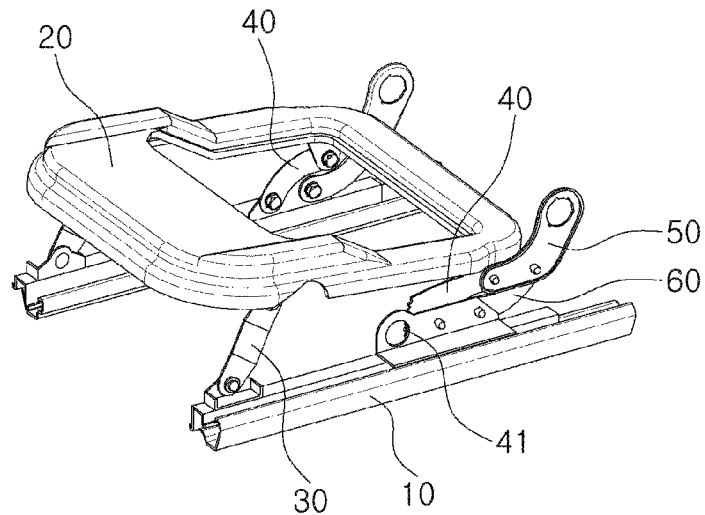
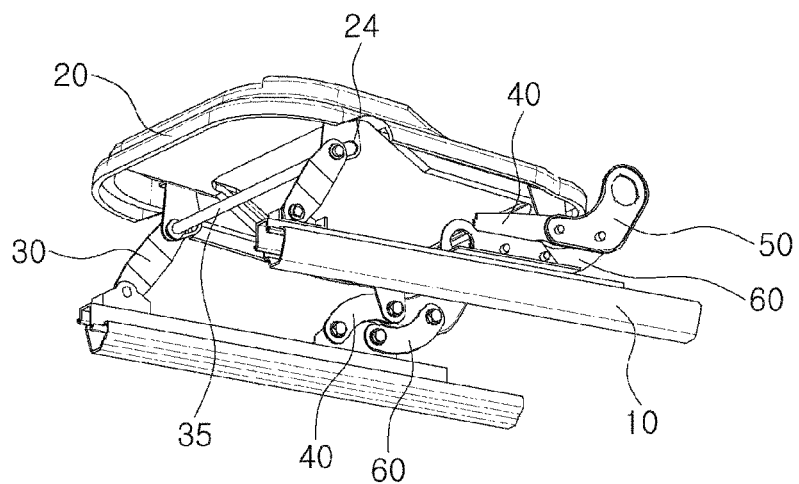

[FIG. 5]
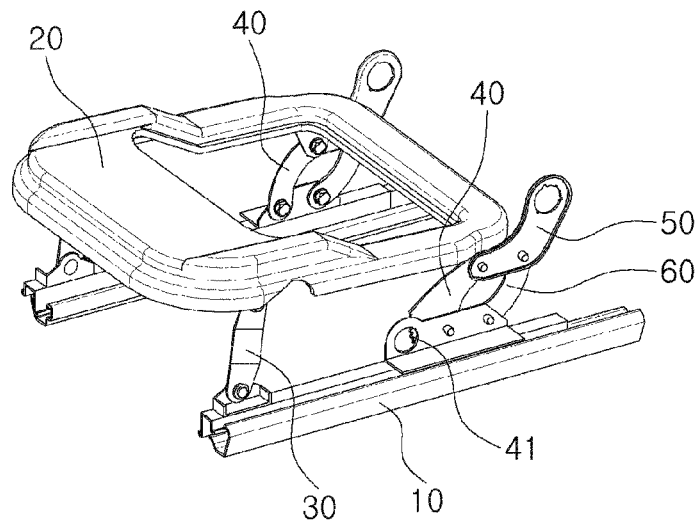
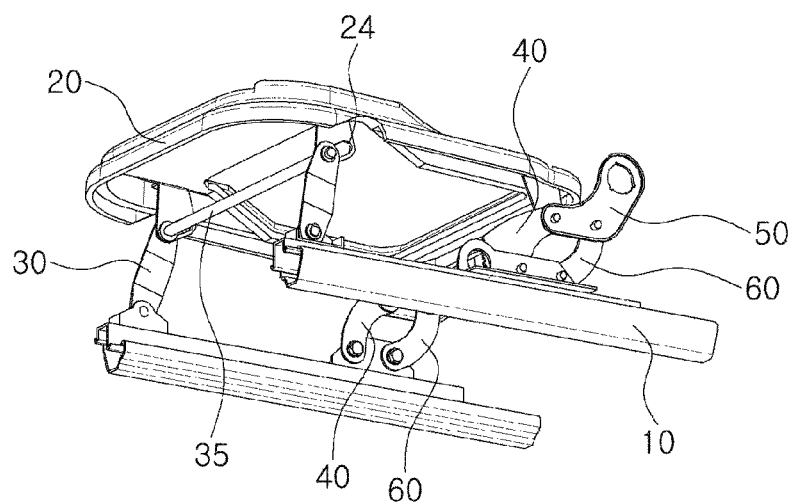

SEAT FRAME

CROSS-REFERENCE OF RELATED APPLICATIONS

This application is the U.S. National Phase under 35 U.S.C. § 371 of International Patent Application No. PCT/KR2020/006944, filed on May 28, 2020, which in turn claims the benefit of Korean Application No. 10-2019-0097437, filed on Aug. 9, 2019, the entire disclosures of which applications are incorporated by reference herein.

TECHNICAL FIELD

The present disclosure relates to a seat frame used, for example, in a vehicle.

BACKGROUND ART

In general, a seat used in a vehicle may include a cushion portion for supporting occupant's buttocks from below, and a backrest portion for supporting occupant's back from behind. Such a seat may be electrically operated by using a motor and gears, to move the cushion portion in a forward direction or a rearward direction, or to lower or raise the backrest portion.

To this end, in the seat, a rail installed in an interior of the vehicle, and cushion side frames provided on both sides of the cushion portion may be connected to each other, and a motor-gears assembly for height adjustment may be installed below the cushion portion.

In this case, since the cushion side frame supports a cushion panel of the cushion portion and is connected to a seatback frame of the backrest portion, the cushion side frame may be considered to be an essential element in a configuration of a seat frame.

However, the cushion side frame was measured to comprise about 8 to 10% of the total weight of the seat frame. As interest in fuel efficiency and environmental pollution of vehicles is rising, research to reduce weight of the vehicle is ongoing in this regard. However, a heavy component such as the cushion side frame or the like is acting as a major obstacle to reducing the weight of the vehicle.

As a related prior art document, there is an invention disclosed in Korean Patent No. 1881272 B1.

DISCLOSURE

Technical Problem

An aspect of the present disclosure is to provide a seat frame capable of reducing weight of a vehicle by omitting a cushion side frame.

Technical Solution

A seat frame according to an aspect of the present disclosure is characterized by including a pair of rails; a cushion frame supporting a cushion and having a closed cross-sectional shape; a front link connecting the rail and the cushion frame on a front side; a rear link connecting the rail and the cushion frame on a rear side; and a connection bracket connecting the rear link and a seatback frame.

Advantageous Effects

As described above, according to the present disclosure, an existing cushion side frame and related components may be omitted, to secure marketability of a seat frame by implementing an operating mechanism required for the seat frame, while reducing the number of components, in addition to a reduction in weight of a vehicle.

In addition, according to the present disclosure, it is possible to ultimately help to improve fuel efficiency and to reduce environmental pollution in a vehicle.

DESCRIPTION OF DRAWINGS

FIG. 1 is a perspective view illustrating a seat frame according to an embodiment of the present disclosure.

FIG. 2 is an exploded perspective view of the seat frame illustrated in FIG. 1.

FIGS. 3 to 5 are views illustrating an operating state of a seat frame according to an embodiment of the present disclosure.

BEST MODE FOR INVENTION

Hereinafter, the present disclosure will be described in detail with reference to example drawings. In assigning reference numerals to components of each of the drawings, it should be noted that the same components may be assigned the same reference numerals as much as possible, even though they are indicated on different drawings.

FIG. 1 is a perspective view illustrating a seat frame according to an embodiment of the present disclosure, and FIG. 2 is an exploded perspective view of the seat frame illustrated in FIG. 1.

As illustrated in these drawings, the seat frame according to an embodiment of the present disclosure may include a pair of rails 10; a cushion frame 20 supporting a cushion (not illustrated) and having a closed cross-sectional shape; a front link 30 connecting the rail and the cushion frame on a front side; a rear link 40 connecting the rail and the cushion frame on a rear side; and a connection bracket 50 connecting the rear link and a seatback frame B.

The pair of rails 10 may be installed, for example, on an interior floor of a vehicle, and may be used to move a seat including the seat frame in a forward direction or a rearward direction. The rails may include a lower rail 11 and an upper rail 12, respectively.

Upper rails 12 operated in a sliding manner may be assembled as lower rails 11 arranged side by side at regular intervals, respectively, and a plurality of first traction brackets 13 may be mounted on an upper surface of each of the upper rails.

Each of the first traction brackets 13 may have a hinge hole 14, and may be connected to the front link 30 or the rear link 40 by hinge shafts 15.

Optionally, a through-hole 16 through which a pinion gear (not illustrated) provided on a rotation shaft of an elevating motor (not illustrated) passes may be formed in one first traction bracket among the first traction brackets 13.

The cushion frame 20 may be connected to the first traction brackets 13 via the front link 30 or the rear link 40, such that the cushion frame may be interlocked according to movement of the upper rail 12 to move in the forward direction or the rearward direction.

For example, a forward-rearward motor (not illustrated) may be installed between the upper rails to simultaneously operate the upper rails 12, and two shafts extending on both sides of the motor may be connected to the upper rails, respectively, to linearly move the cushion frame 20 attached to the upper rail in the forward direction or the rearward direction by driving the forward-rearward motor.

The cushion frame 20 may be formed to have a closed cross-sectional shape, to supporta cushion formed of an elastic material, and may have an outer shell overlaid together with the cushion. In this manner, the cushion frame may have the closed cross-sectional shape to acquire an effect of reinforcing structural rigidity.

A plurality of second traction brackets 23 may be mounted on both sides of a lower surface of the cushion frame 20, to connect the front link 30 or the rear link 40 to the cushion frame.

In the drawings, for example, a second traction bracket 23 is separately attached to the cushion frame 20, but the present disclosure is not necessarily limited thereto, and the second traction bracket may be integrally formed with the cushion frame.

Each of the second traction brackets 23 may have a hinge hole 24, and may be connected to the front link 30 or the rear link 40 by hinge shafts 25.

The hinge hole 24 of each of the second traction bracket 23 on the front side, connected to the front link 30, may be formed as an long, inclined hole, and a position of each of the hinge shafts 25 may be changed in the hinge hole.

The front link 30 and the rear link 40 may respectively be hinged to the first traction brackets 13 and the second traction brackets 23, to move the cushion frame 20 in forward and upward directions or in rearward and downward directions. To this end, the front link and the rear link may have hinge holes 34 and 44, respectively.

In this case, forward and rearward movement of the cushion frame 20 by the front link 30 and the rear link 40 may be distinguished from forward and rearward movement of the cushion frame 20 by the upper rail 12, in that upward and downward movements of the cushion frame are involved, and may be a relative positional movement with respect to the upper rail.

Among the hinge axes of the front link 30, the hinge shafts 25 inserted into the hinge hole 24, formed as the long, inclined hole, of the second traction bracket 23 on the front side may be connected to each other by a support rods 35. When one side of the cushion frame 20 in a lateral direction moves in forward and upward directions or in rearward and downward directions, the other side thereof may be also interlocked. Therefore, the cushion frame may move smoothly while maintaining its equilibrium laterally.

A rack gear 41 formed in an approximately arc shape may be provided on one of the front links 30 or one of the rear links 40 of the cushion frame 20, disposed in the lateral direction. The drawings illustrate an example in which the rack gear is provided on one of the rear links.

Such a rack gear may pass through the through-hole 16 formed in one of the above-described first traction brackets 13, and may engage with the pinion gear provided on the rotary shaft of the elevating motor. Therefore, driving force for movement of the cushion frame 20 may be transmitted from the elevating motor.

FIGS. 3 to 5 are views illustrating an operating state of a seat frame according to an embodiment of the present disclosure.

One end of a rack gear 41 provided on one rear link, among rear links 40, may be meshed with a pinion gear installed on one of first traction brackets 13. In this state, when the pinion gear rotates in a given direction by an elevating motor, the pinion gear may move relative to the rack gear, to rotate the one rear link having the rack gear about a hinge shaft 15, change inclination of the one rear link, and entirely move a cushion frame 20 in forward and upward directions. The rack gear may not disengage from engagement with the pinion gear.

Since the other rear link 40 having no rack gear is connected to the one rear link 40 having the rack gear 41 by the cushion frame 20 having a closed cross-sectional shape, the other rear link having no rack gear may be also interlocked when the one rear link having the rack gear rotates about the hinge shaft 15. Therefore, the cushion frame may entirely move in forward and upward directions while maintaining its equilibrium in the lateral direction.

Then, when the pinion gear rotates in a reverse direction by the elevating motor in this state, the pinion gear may move relatively along the rack gear 41 in a direction, opposite to the previous direction. Therefore, the one rear link 40 having the rack gear may rotate about the hinge shaft 15 in the reverse direction, inclination of the rear link may be changed, and the cushion frame 20 may entirely move in rearward and downward directions.

In addition, when the cushion frame 20 moves in forward and upward directions or in rearward and downward directions, hinge shafts 25 of front links 30 connected to each other via a support rod 35 may relatively move in hinge holes 24 formed as long, inclined holes of second traction brackets 23 on a front side, to adjust an angle of the cushion frame in the forward or rearward direction.

As such, due to driving of the elevating motor, relative movement of the pinion gear, rotation of the front link 30 and the rear link 40, and relative movement of the hinge shafts 25, a height and an angle of the cushion frame 20 may be adjusted.

A seatback frame B may be assembled onto a rear side of the cushion frame 20.

In the seat frame according to an embodiment of the present disclosure, the seatback frame may be connected to the rear links 40 through a pair of connection brackets 50.

A hinge hole 54 for connection with the rear link 40 may be provided on one side of each of the connection brackets 50, and a mounting hole 55 for assembling the seatback frame may be formed on the other side thereof.

For example, a rotation motor (not illustrated) may be mounted on one interior side of the seatback frame, and the seatback frame may be configured to rotate around the mounting hole 55, to adjust an angle of the seatback frame.

After the hinge holes 54 of the connection brackets 50 are aligned to communicate with the hinge holes 24 of the second traction brackets 23 and hinge holes 44 of the rear links 40, respectively, the hinge shafts 25 may be inserted into the hinge holes, to connect the connection brackets and the rear links, respectively, but the present disclosure is not necessarily limited thereto.

In addition, in the seat frame according to an embodiment of the present disclosure, auxiliary links 60 connecting the connecting brackets 50 and the first traction brackets 13 may be included such that each of the connecting brackets 50 has a certain orientation and posture.

To this end, the connection brackets 50 and the first traction brackets 13 on the rear side may further have hinge holes 54 and 14, respectively.

In addition, the auxiliary links 60 may also have hinge holes 64, to be separately connected to the hinge holes 54 of the connection brackets 50 or the hinge holes 14 of the first traction brackets 13 on the rear side by hinge shafts 65.

When such an auxiliary link 60 is provided, the pinion gear rotates by the elevating motor to relatively move along the rack gear 41, and a rear link 40 having a rack gear and a rear link having no rack gear respectively rotate about hinge shafts 15, the auxiliary links may also rotate about the hinge shafts 65, respectively, and the connection brackets 50 may move in the forward and rearward directions while moving in the upward direction.

In this case, the auxiliary links 60 may implement a parallel link together with the rear links 40, to move the connection brackets 50 in parallel, with a certain orientation and posture.

Therefore, the seatback frame B may change a forward or rearward position and a upward or downward position, together with the cushion frame 20, not an angle. For example, a change in angle of the seatback frame may not correlate with an operation of the cushion frame.

When an existing cushion side frame is simply omitted to achieve light weight of the seat frame, assembly of various components related to the cushion side frame may be impossible. Therefore, the seat frame itself may not be formed. Moreover, as the seat frame is a kinematic moving system, a height or an angle of the cushion should be adjustable, while a position of the seatback should also be varied when the cushion moves.

In the seat frame according to an embodiment of the present disclosure, it is characterized in that a shape of the cushion frame is changed, an long, inclined hole is adopted as a hinge hole of a second traction bracket on a front side, and parallel links composed of an auxiliary link and a rear link are introduced into a connection bracket for a seatback frame.

As described above, according to the present disclosure, an existing cushion side frame and related components may be omitted, to secure marketability of a seat frame by implementing operating mechanism required for the seat frame, while reducing the number of components, in addition to a reduction in weight of a vehicle.

In addition, according to the present disclosure, it is possible to ultimately help to improve fuel efficiency and to reduce environmental pollution in a vehicle.

While example embodiments have been illustrated and described above, it will be apparent to those skilled in the art that modifications and variations could be made without departing from the scope of the present disclosure as defined by the appended claims.

INDUSTRIAL APPLICABILITY

As described above, the present disclosure is useful for constructing a seat used in a vehicle and reducing weight thereof.

The invention claimed is:

1. A seat frame comprising:
a pair of rails, wherein each of the pair of rails comprises a lower rail and an upper rail slidably coupled to the lower rail, and wherein a plurality of first traction brackets mounted on an upper surface of the upper rail;
a cushion frame supporting a cushion and having a closed cross-sectional shape;
a front link connecting the rail and the cushion frame on a front side;
a rear link connecting the rail and the cushion frame on a rear side;
a connection bracket connecting the rear link and a seatback frame; and
an auxiliary link hinging the connection bracket to the first traction bracket on the rear side, wherein the front link or the rear link is hinged to the first traction bracket.

2. The seat frame according claim 1, wherein a through-hole through which a pinion gear provided on a rotary shaft of an elevating motor passes is formed in the first traction bracket, and
the front link or the rear link has a rack gear to engage the rack gear and the pinion gear.

3. The seat frame according claim 1, wherein a plurality of second traction brackets are provided on a lower surface of the cushion frame,
wherein the front link or the rear link is hinged to the second traction bracket.

4. The seat frame according claim 3, wherein a hinge hole of the second traction bracket on the front side, connected to the front link, is formed as an long, inclined hole,
wherein a position of a hinge shaft connecting the front link is changed in the hinge hole formed as the long, inclined hole.

5. The seat frame according claim 4, wherein the hinge shaft, inserted into the hinge hole, formed as the long, inclined hole, of the second traction bracket on the front side, is provided as a plurality of hinge shafts, wherein the plurality of hinge shafts are connected to each other by a support rod.

6. The seat frame according claim 3, wherein the connection bracket has one side having a hinge hole connected to the rear link, and the other side having a mounting hole assembling the seatback frame.

7. A seat frame comprising:
a pair of rails, wherein each of the pair of rails comprises a lower rail and an upper rail slidably coupled to the lower rail, and wherein a plurality of first traction brackets are mounted on an upper surface of the upper rail;
a cushion frame supporting a cushion and having a closed cross-sectional shape, wherein a plurality of second traction brackets are provided on a lower surface of the cushion frame;
a front link connecting the rail and the cushion frame on a front side;
a rear link connecting the rail and the cushion frame on a rear side; and
a connection bracket connecting the rear link and a seatback frame, wherein the connection bracket has one side having a hinge hole connected to the rear link, and the other side having a mounting hole assembling the seatback frame,
wherein the hinge hole of the connection bracket is aligned to communicate with a hinge hole of the second traction bracket and a hinge hole of the rear link, and is inserted into a hinge shaft,
wherein the front link or the rear link is hinged to the first traction bracket, and
wherein the front link or the rear link is hinged to the second traction bracket.

\* \* \* \* \*